W. HALL.
Car Brake.
No. 9,135
Patented July 20, 1852.
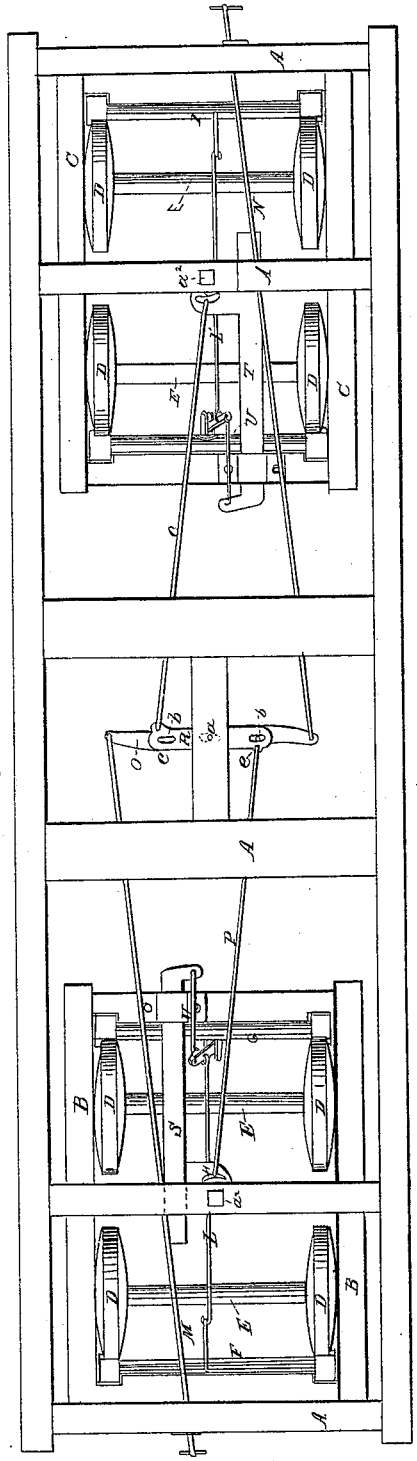
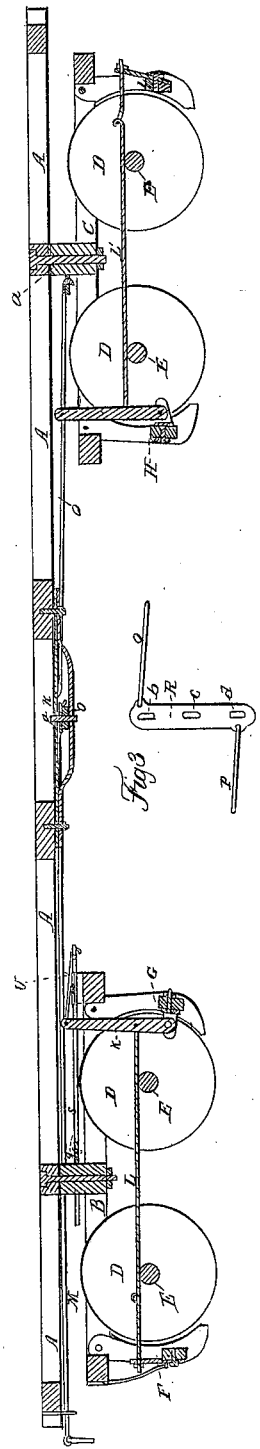

UNITED STATES PATENT OFFICE.

WILLIAM HALL, OF NORTH ADAMS, MASSACHUSETTS.

RAILROAD-CAR BRAKE.

Specification of Letters Patent No. 9,135, dated July 20, 1852.

*To all whom it may concern:*

Be it known that I, WILLIAM HALL, of North Adams, in the county of Berkshire and State of Massachusetts, have invented certain new and useful Improvements in Machinery for Operating the Brakes of Railway-Cars; and I do hereby declare that the same are fully described and represented in the following specification and the accompanying drawings, letters, figures, and references thereof.

Of the said drawings Figure 1 denotes a top view of the platform frame and two truck frames of a railway "long car," provided with my improvements. Fig. 2 is a vertical, central, and longitudinal, section of the same.

In the said drawings A exhibits the platform frame of the car, as made to rest or be supported in the usual way on two truck frames B, C. The wheels of the truck frames are seen at D, D, &c., while E, E, &c., indicate their axles, and F, G, H, I, the four brake frames or sets of brakes, arranged with respect to each set of wheels as seen in the drawings. Each brake frame is suspended at its upper end in the usual manner, so as to be capable of swinging either toward or away from its wheels.

To each inner set of brakes a lever K or K' is jointed, such lever being connected by a connecting rod L, or L' to the next adjacent outer set of brakes, the whole being in such manner that when the upper end of either lever is pulled in a direction toward the middle of the platform A the two sets of brakes immediately connected to such lever will be drawn against their respective sets of wheels. In order to enable a brakeman standing at either end of a car to operate the brakes of both trucks at one and the same time it is customary to make use of two draw rods M, N, a lever O, and two rods P, Q, the lever O being placed in the middle of the under part of the platform of the car and made to turn horizontally on a fulcrum $a$. To the extremities of such lever the two draft rods M, N, are jointed, and made to respectively extend toward the two ends of the platform as seen in the drawings. At their outer ends they are generally connected with the brake windlasses by chains as is well known. To each arm of the said lever and between the fulcrum of the lever and the outer end of the arm, one of the rods P, Q, was connected or jointed, the other end of the said rod being jointed to the contiguous brake lever K or K'. Under such circumstances while the car is traveling on a straight track any draft on any of the rods M, N, would create the same amount of strain on the brakes of one truck as on those of the other, but when the trucks were on a curved track or one on a straight one and the other on a curve, an inequality of strain is produced on the brakes of the two trucks. In order to obviate this difficulty I apply to the lever O a detached lever R shaped as seen in Fig. 3, which denotes it as separated from the lever O. This detached lever is made with three slots $b$, $c$, $d$, through it, and it is placed on the lever O so that the fulcrum of the lever may pass through the central slot while the other slots $b$, $d$, are made respectively to receive pins or projections $e$, $f$, that extend upward from the top surface of the lever O, so that it will be readily seen that the detached lever R is enabled to freely slide in longitudinal directions on the lever O. The connecting rods P, Q, are jointed to the detached lever instead of the lever O, and instead of being jointed at their other ends directly to the brake levers K, K', they are jointed to sliding radius bars S, T, one of which is arranged on each truck frame and formed as seen in the drawings and made to slide freely in longitudinal directions.

The attachment of the end of the rod P or Q to the radius bar is by means of a projection therefrom in which a curved slot $g$ is formed, the curve of the slot being struck with a radius that has its center at the turning center of the truck frame or thereabout.

Each lever K or K' is connected at its upper end by means of a rod U or U', with the inner end of, or a projection from the inner end of the sliding radius bar, next adjacent to it, the rod being jointed both to the lever and radius bar.

It is to be understood that in the use of my invention each truck frame generally speaking is to have a horizontal rotation or movement under the platform on a center pin $a^2$ or its equivalent, and that the curved slot $g$ is to be arranged with its middle in the middle of the truck frame. It is not absolutely necessary that the truck frame should have such a horizontal rotation, for my invention is intended to operate to produce equality of strain on the brakes of both trucks, whenever the connecting rods are strained or become worn to an unequal length.

By producing draft on either of the two rods M, N, it will be seen that the detached lever R will slide endwise on the lever O until the strain on the brakes of both truck frames is equalized.

The radius bar has its advantages whether the truck frame be made either to rotate or not to rotate horizontally. It is particularly useful when the frame does so rotate, as it not only produces direct strain on the levers K, K′, in the plane of their movement, but it accommodates the mechanism to any horizontal movement of the truck frame under the platform of the car.

What I claim as of my invention is—

The combination of the sliding detached lever R, with the main lever O and the connecting rods P, Q, so as to operate essentially in manner and for the purpose as hereinbefore specified.

In testimony whereof I have hereto set my signature, this nineteenth day of March A. D. 1852.

WILLIAM HALL.

Witnesses:
ELIHU S. HAWKES,
LORENZO RICE.